(12) United States Patent
Luo

(10) Patent No.: US 8,168,913 B2
(45) Date of Patent: May 1, 2012

(54) ELECTRIC DISCHARGE MACHINING DIE SINKING DEVICE

(75) Inventor: Yuefeng Luo, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 351 days.

(21) Appl. No.: 12/473,318

(22) Filed: May 28, 2009

(65) Prior Publication Data

US 2010/0301017 A1 Dec. 2, 2010

(51) Int. Cl.
*B23H 1/00* (2006.01)
*B23H 7/14* (2006.01)
*B23H 7/26* (2006.01)
*B23H 7/30* (2006.01)

(52) U.S. Cl. ............... 219/69.15; 219/69.13; 219/69.16; 219/69.18

(58) Field of Classification Search ............... 219/69.15, 219/69.17, 69.2, 69.11, 69.16, 69.13, 69.18
See application file for complete search history.

(56) References Cited

U.S. PATENT DOCUMENTS

| | | | | |
|---|---|---|---|---|
| 3,035,151 A | * | 5/1962 | Weglarz | 219/69.15 |
| 3,372,099 A | * | 3/1968 | Clifford | 219/69.15 |
| 3,467,807 A | * | 9/1969 | Livshits et al. | 219/69.15 |
| 3,498,158 A | * | 3/1970 | Kougel | 219/69.17 |
| 3,588,196 A | * | 6/1971 | Bonga | 219/69.16 |
| 3,843,864 A | * | 10/1974 | Wohlabaugh | 219/69.16 |
| 4,392,043 A | * | 7/1983 | Inoue | 219/69.18 |
| 4,504,721 A | * | 3/1985 | Inoue | 219/69.17 |
| 4,510,365 A | * | 4/1985 | MacGregor et al. | 219/69.16 |
| 4,553,012 A | * | 11/1985 | Anderson | 219/69.15 |
| 4,734,173 A | * | 3/1988 | Walter et al. | 219/69.17 |
| 4,792,654 A | * | 12/1988 | Trujillo | 219/69.2 |
| 4,947,016 A | * | 8/1990 | Puyplat | 219/69.17 |
| 5,049,715 A | * | 9/1991 | Tanaka | 219/69.15 |
| 5,091,622 A | * | 2/1992 | Ohba | 219/69.15 |
| 5,951,884 A | * | 9/1999 | Futamura | 219/69.2 |
| 6,310,313 B1 | * | 10/2001 | Akune et al. | 219/69.2 |
| 6,531,036 B1 | * | 3/2003 | Leitgeb et al. | 204/164 |
| 2001/0001841 A1 | * | 5/2001 | Sugiyama et al. | 700/192 |

FOREIGN PATENT DOCUMENTS

| | | | | |
|---|---|---|---|---|
| GB | 1483987 A | * | 8/1977 | |
| GB | 2095589 A | * | 10/1982 | |
| JP | 4256520 A | * | 9/1992 | |
| JP | 5-38633 A | * | 2/1993 | |
| JP | 2000-71124 A | * | 3/2000 | |

* cited by examiner

*Primary Examiner* — Geoffrey S Evans
(74) *Attorney, Agent, or Firm* — Hoffman Warnick LLC; Ernest G. Cusick

(57) ABSTRACT

An EDM die sinking device includes a tank for holding a fluid, and at least one electrode in the tank having a shape for imparting to a first portion of a workpiece. A workpiece holder positions the workpiece at least partially immersed in the fluid and alternately moves the workpiece between an inoperable position and a first operable position of the first electrode at which electric discharge machining occurs on the first portion. A pulse generator creates an electric discharge between the first portion and the first electrode to remove material from the first portion in response to the workpiece being in the first operable position. Movement of the workpiece from the electrode flushes particle containing fluid away from the workpiece and the electrode. A segmented electrode includes a separate pulse generator for each segment may also be employed.

17 Claims, 8 Drawing Sheets

ELECTRIC DISCHARGE MACHINING DIE SINKING DEVICE

BACKGROUND OF THE INVENTION

The invention relates generally to electric discharge machining (EDM). More particularly, the invention relates to EDM die sinking devices exhibiting higher metal removal rates and lower surface roughness than conventional EDM devices.

EDM die sinking has been used to make a variety of metal structures in small volumes. EDM die sinking typically involves placing a workpiece into a tank of fluid such as hydrocarbon-based oil. A die electrode having a mirror image of the desired shape for the workpiece is moved by a ram into close proximity to the workpiece, and an electric pulse is then repetitively applied to the gap between the die electrode and the workpiece to cause electric discharges that remove material from the workpiece. EDM die sinking has the capability of machining difficult metals or alloys without high cutting force and hard tools, which makes the process cost-efficient and less complex than conventional machining techniques. One possible application for EDM die sinking is in the manufacture of airfoil shapes on turbine blades, which are made of heat resistant, nickel-based alloys that withstand the ever-increasing temperatures of steam turbines. These tough alloys present considerable difficulties in part production because the intricate shapes required are difficult to machine, which drives the cost of equipment and operation higher. Although EDM die sinking is an attractive process for machining these alloys, a number of challenges currently limit its use.

BRIEF DESCRIPTION OF THE INVENTION

A first aspect of the disclosure provides an electric discharge machining (EDM) die sinking device comprising: a tank for holding a fluid; a first electrode in the tank, the first electrode having a shape for imparting to a first portion of a workpiece; a workpiece holder for positioning the workpiece at least partially immersed in the fluid and alternately moving the workpiece between an inoperable position and a first operable position of the first electrode at which electric discharge machining occurs on the first portion; and a pulse generator for creating an electric discharge between the first portion and the first electrode to remove material from the first portion in response to the workpiece being in the first operable position.

A second aspect of the disclosure provides an electric discharge machining (EDM) die sinking device comprising: a first electrode including a plurality of electrode segments, the first electrode including a first shape for imparting to a first portion of a workpiece; a separate electric pulse generator coupled to each electrode segment of the first electrode; and a pulse controller coupled to each separate electric pulse generator for generating an electric discharge on each electrode segment independently of other electrode segments to remove material from the first portion.

DETAILED DESCRIPTION OF THE INVENTION

Figure 1:
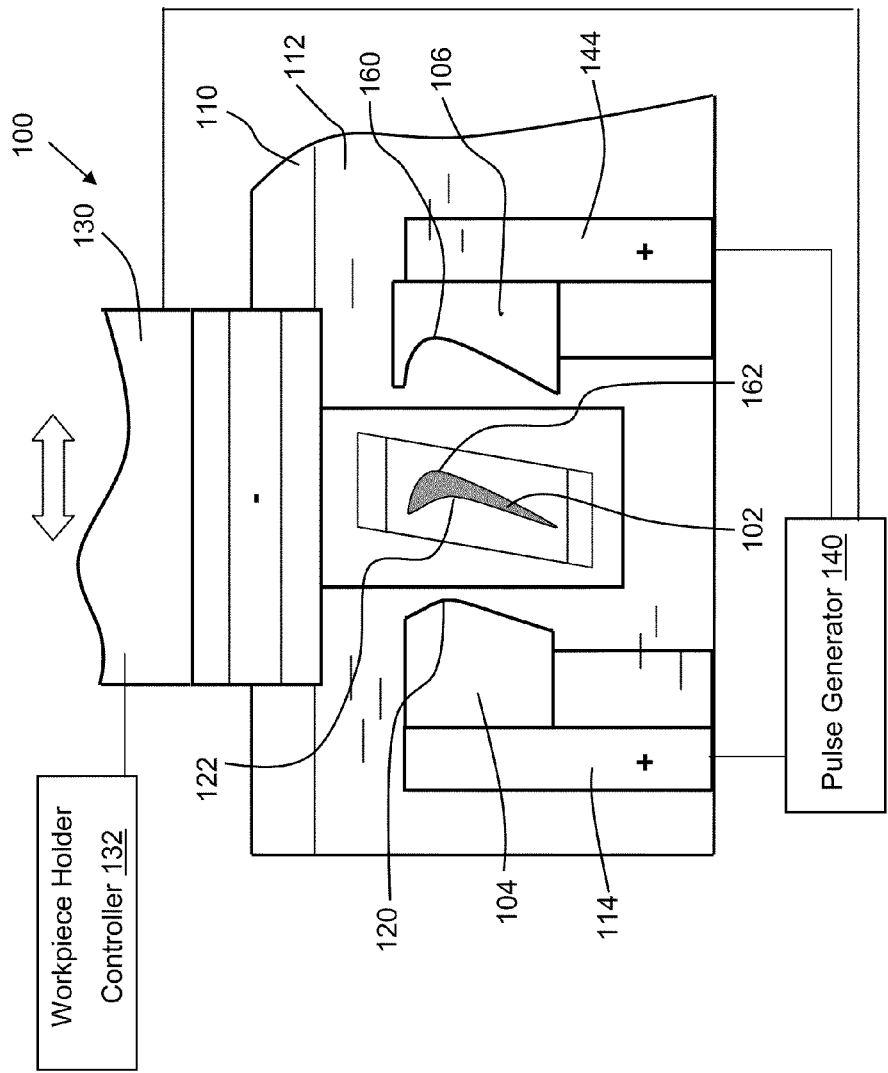
FIG. 1 shows an electric discharge machining (EDM) die sinking device according to embodiments of the invention.
Figure 2:
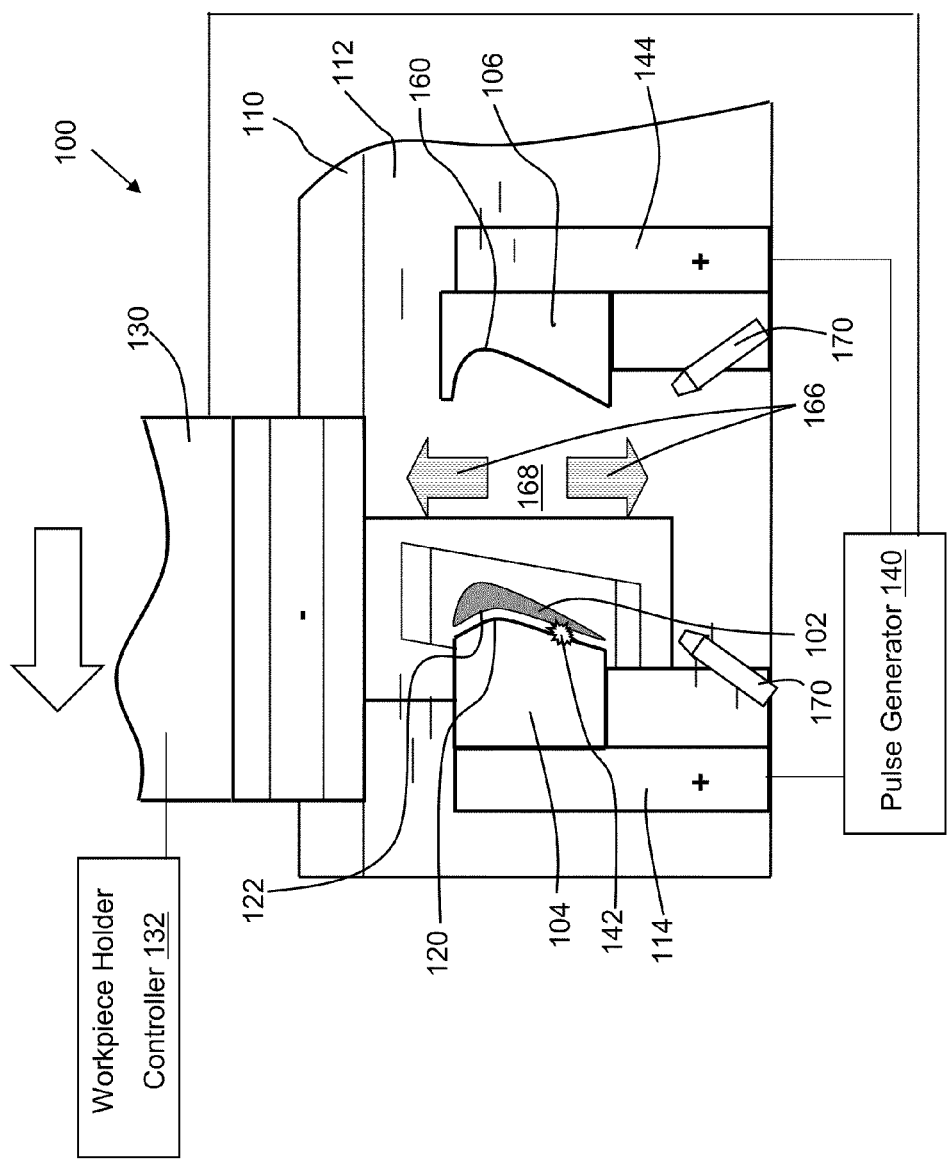
FIGS. 2-3 show the EDM die sinking device of FIG. 1 at two different operable positions.
Figure 3:
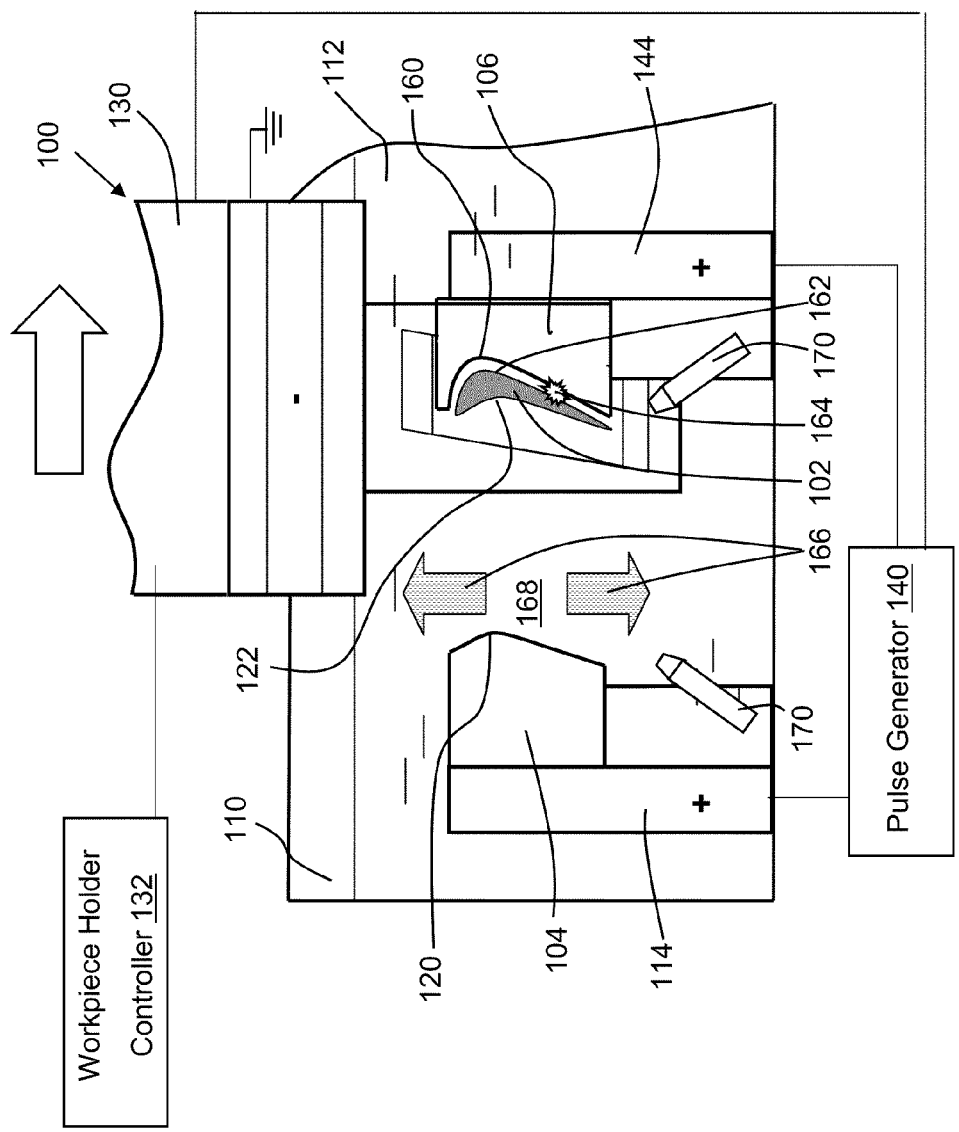

Referring to the drawings, and in particular FIGS. 1-3, embodiments of an electric discharge machining (EDM) die sinking device will be described. EDM die sinking device 100 applies an electric discharge to a workpiece 102 by one or more electrodes 104, 106 to remove material from the workpiece. Electrodes 104, 106 and workpiece 102 are made of conductive material. Workpiece 102 may be made of practically any conductive material, but EDM die sinking device 100 is especially applicable to harder materials such as heat resistant, nickel-based alloys such as Inconel, which are difficult to machine using conventional machining. As shown in FIG. 1, in one embodiment, EDM die sinking device 100 includes a tank 110 for holding a fluid 112. Fluid 112 may include hydrocarbon-based oil, or other dielectric liquid, used to, among other things, maintain media insulation before each electrical discharge, capture particles removed from workpiece 102, and disperse heat. FIG. 1 shows EDM die sinking device 100 with workpiece 102 in an inoperable position between operable positions, as will be described herein.

A first electrode 104 is positioned within tank 110 by, for example, a fixture 114, and is immersed in fluid 112. First electrode 104 may have a shape 120 (i.e., die) for imparting to a first portion 122 of workpiece 102, as shown in FIG. 2. As illustrated, workpiece 102 includes first portion 122 having a concave airfoil configuration. Consequently, shape 120 of first electrode 104 is a mirror image of first portion 122, i.e., a convex airfoil shape, after machining is complete. It is understood, however, that the shape shown for first electrode 104 is merely illustrative and can be practically any shape, including a plane. It is also understood that electrode(s) 104, 106 may extend in a direction perpendicular to the page of FIG. 1.

A workpiece holder 130 positions workpiece 102 at least partially immersed in fluid 112. Workpiece holder 130 may include any structure capable of holding workpiece 102 in the appropriate orientation for use in EDM die sinking device 100, e.g., a hydraulically or electrically driven ram. This arrangement with workpiece 102 on a movable workpiece holder 130 and electrode(s) 104, 106 in tank 110 represents a departure form conventional EDM die sinking techniques, which immovably place the workpiece in the tank and move a single electrode into proximity to the workpiece. The current arrangement allows for use of more than one electrode and results in faster machining from multiple sides of the workpiece. In the example shown, workpiece 102 is to be shaped into a turbine bucket or nozzle, and as such workpiece holder 130 must be able to support workpiece 102 in a cantilevered fashion for application to electrode(s) 104, 106. As shown by comparing FIGS. 1 and 2, workpiece holder 130, under the control of a workpiece holder controller 132, alternately moves workpiece 102 between inoperable position (FIG. 1) and a first operable position (FIG. 2) of first electrode 104 at which electric discharge machining occurs on first portion 122. Workpiece holder controller 132 may include any now known or later developed computerized controller for controlling manipulation of workpiece holder 130 using any required movers (e.g., motors, conveyors, hydraulic rams, pneumatic rams, and the like) and/or any required sensors (e.g., position sensors such as infrared or laser-based sensors, and the like). Workpiece holder controller 132 may be mechanically fixed with workpiece 102, and may move workpiece 102 in any direction, i.e., laterally and vertically to enable all the necessary motions. Workpiece holder controller 132 may be electrically insulated from workpiece 102.

As shown in FIG. 2, a pulse generator 140 creates an electric discharge 142 between first portion 122 and first electrode 104 to remove material from first portion 122 in response to workpiece 102 being in the first operable position. Pulse generator 140 may include any now known or later developed mechanism for causing electric discharge 142 between first electrode 104 and first portion 122 sufficient to cause removal of material from first portion 122. As known in the art, electric discharge 142 may move along the space between first portion 122 and first electrode 104 to remove material along the entire surface of first portion 122 where the space therebetween is sufficiently small to sustain electric discharge 142. In contrast to conventional EDM, pulse generator 140 may cause tank 110 with fixtures 114 and 144 to have a positive polarity and workpiece holder 130 to have a negative polarity. Pulse generator 140 may be coupled to or combined with workpiece holder controller 132 such that pulse generator 140 can provide feedback to workpiece holder controller 132 for purposes described herein.

As noted above, EDM die sinking device 100 may also include a second electrode 106 positioned in tank 110 by, for example, a fixture 144, which allows workpiece 102 to be quickly exposed to multiple electrodes in a single setup. Second electrode 106 includes a second shape 160 (i.e., die) for imparting to a second portion 162 of workpiece 102. As illustrated, workpiece 102 includes second portion 162 (FIG. 3) having a convex airfoil configuration. Consequently, shape 160 of second electrode 106 is a mirror image of second portion 162, i.e., a concave airfoil shape, after machining is complete. It is understood, however, that the shape shown for second electrode 106 is merely illustrative and can be practically any shape, including planar.

Where two electrodes 104, 106 are provided, workpiece holder 130 (via workpiece holder controller 132) alternately moves workpiece 102 between the first operable position (FIG. 2) of first electrode 104 at which electric discharge machining occurs on first portion 122, the inoperable position shown in FIG. 1, and a second operable position (FIG. 3) of second electrode 106 at which electric discharge machining occurs on second portion 162. In the second operable position shown in FIG. 3, pulse generator 140 creates an electric discharge 164 between second portion 162 and second electrode 106 to remove material from second portion 162 in response to workpiece 102 being in the second operable position. The alternating movement continues until both portions 122, 162 reach the dimensional destination mandated by shapes 120 and 160, respectively, at which point the movement is stopped. Consequently, workpiece 102 can be shaped into an airfoil by the alternating movement of the workpiece between the two electrodes 104, 106, and orchestrated electric discharges 142, 164 created by pulse generator 140. As known in the art, electric discharge 164 may move along the space between second portion 162 and second electrode 106 to remove material along the entire surface of second portion 162 where the space is sufficiently small to sustain electric discharge 164. In contrast to conventional EDM, pulse generator 140 causes second fixture 144 in tank 110 to have a positive polarity, and workpiece holder 130 to have a negative polarity.

Although not necessary, as illustrated, first shape 120 of first electrode 104 and second shape 160 of second electrode 106 may be configured to form an uninterrupted surface on workpiece 102. In the example shown, first shape 120 and second shape 160 are configured to form an airfoil shape for a blade or nozzle for a turbine. In this manner, workpiece 102 can be shaped into practically any shape, simple or complex, using EDM die sinking device 100. It is understood, however, that one, two, or more than two electrodes 104, 106 all may be used depending on the structure to be manufactured. For example, in some cases, where the manufactured part only requires machining in one area, only one electrode may be used. Similarly, where the manufactured part includes surfaces with identical features (e.g., is symmetrical), one electrode may be employed to machine each surface with workpiece holder 130 providing sufficient workpiece 102 manipulation to accommodate machining of the requisite areas. Similarly, where more complex manufactured parts are required, any number of electrodes with different shapes may be employed and workpiece holder 130 configured to move between them within one or more tanks 110.

As shown in FIGS. 2 and 3, EDM creates a particle containing fluid 166 (e.g., dielectric oil)(shown within arrows) including particles of workpiece 102 suspended therein. One challenge related to increasing the speed of machining using conventional EDM die sinking is removing the particles from near workpiece 102. In the embodiment illustrated, the space between workpiece 102 and electrode 104 or 106 contains particle containing fluid 166, which has a high temperature. Since the interface between workpiece 102 and electrode 104 or 106 is situated vertically, the hot fluid 166 naturally flows upwards and carries some particles out off the space. However, EDM die sinking device 100 through movement of workpiece 102 between the inoperable position, shown in FIG. 1, and either the first operable position, shown in FIG. 2, or the second operable position, shown in FIG. 3, causes the particle containing fluid 166 to be at least partially drawn out of a space 168 vacated by workpiece 102. That is, movement of workpiece 102 via workpiece holder 130 causes a fluid vacuum in space 168 sufficient to flush particle containing fluid 166 from space 168, and replace it with cleaner fluid 112. Consequently, each time workpiece 102 is alternately moved, cleaner fluid 112 is present within the space between an electrode 104, 106 and workpiece 102, which allows for faster and better machining. If desired, as shown in FIG. 3 only, nozzle(s) 170 may be positioned near space 168 to intensify the flushing action. Nozzle(s) 170 create a jet of cleaner fluid 112 below space 168 to intensify the convection through space 168. In this manner, more frequent discharges of clean fluid 112 can be applied to attain a faster particle removal rate. Any number of nozzles may be employed.

Figure 4:
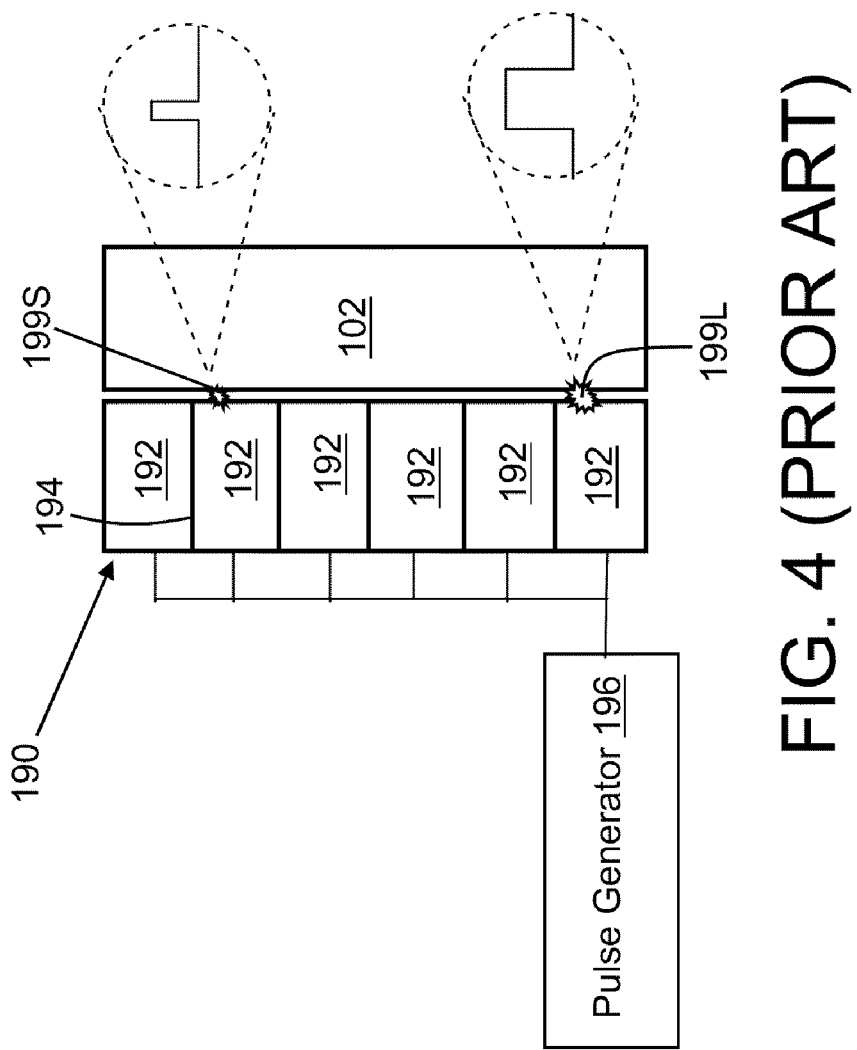
FIG. 4 shows a prior art multiple segment EDM electrode.

Turning to FIG. 4, other challenges for conventional EDM die sinking machining relative to use for precision manufactured parts and mass production is that it either has too low of a metal removal rate (MRR) or it creates insufficiently uniform machining due to large discharge craters or a rough surface. FIG. 4 illustrates the challenge relative to a conventional multiple segment electrode 190. As known in the art, a multiple segmented electrode 190 includes a number of electrode segments 192, each separated by an insulation layer 194 therebetween (only one labeled for clarity). As illustrated, a single pulse generator 196 is coupled to all of the multiple electrode segments 192 to deliver a single voltage pulse, which after an ignition delay or gap stressing, typically creates an electric discharge 199L that may grow in size. During this single voltage pulse, other electrical discharges 199S on other segments may or may not occur due to the different and random particle densities and local temperature. By the same token, other electrical discharges 199S may ignite at a later time than the initial discharge 199L, which results in shortened discharge duration and a smaller removal amount. After a certain pulse duration, the pulse is turned off to control the discharge energy and de-ionize the gap between the electrode and workpiece for the next round of discharging. Electric discharges 199L, 199S are not typically equal in strength (current) and discharge duration. More specifically, the strength of the electric discharge and the duration is reliant on the spacing between electrode segments 192 and workpiece 102 and local particle density/temperature, which may vary along the surfaces of the workpiece and the electrode. Electric discharge 199L is relatively strong and long in duration (as shown by the graph to the right of the discharge) and results in a large metal removal rate and a poor surface quality with large craters. In contrast, another electric discharge 199S may be relatively weak and short in duration (as shown by the graph to the right of the discharge) and may result in a low metal removal rate. Further, shorter electric discharges 199S tend to wear the electrode. Consequently, the machining can be very uneven and result in pitting in one location and undermachining in another. This situation is inoperative for parts where precision is required, and may be especially profound where curved surfaces are created. The probability of multiple uniform electrical discharges is very low because the different locations and oil situations prohibit discharge uniformity with a single pulse source. Thus, the original purpose of multiple pulse electrodes is not realized even with the multiple electrode segments.

Figure 5:
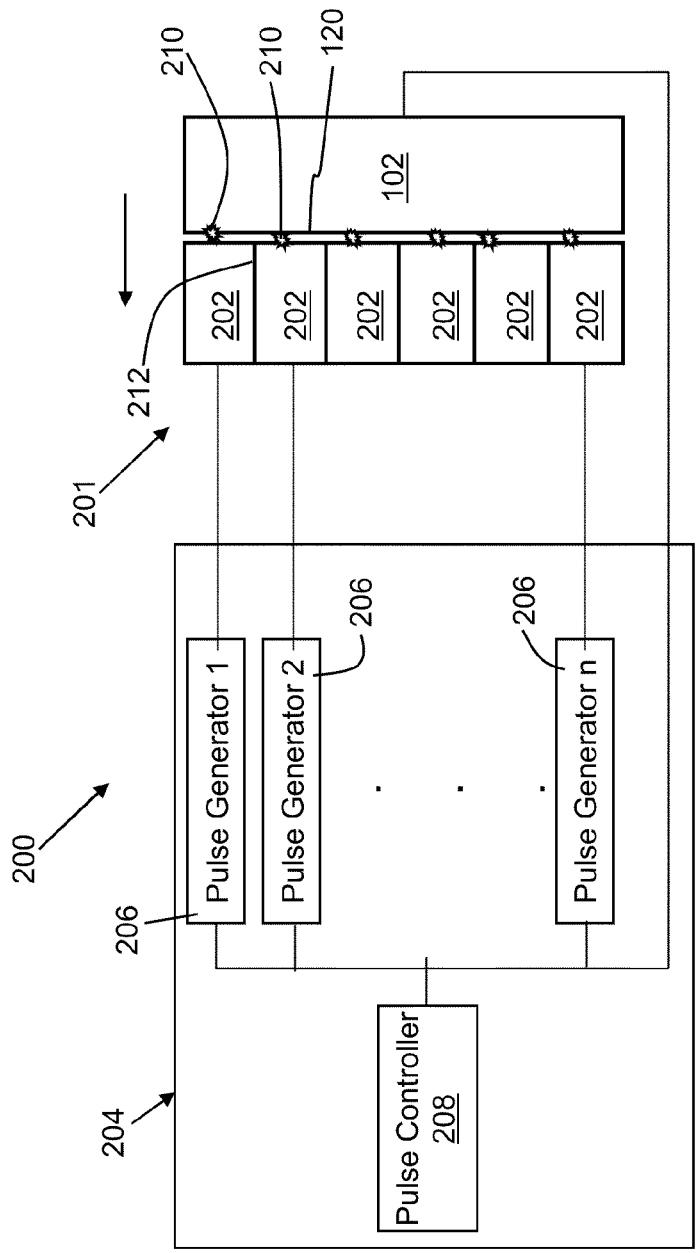
FIG. 5 shows an EDM die sinking device having an electrode with a plurality of segments and a pulse generator for each segment according to embodiments of the invention.
Figure 6:
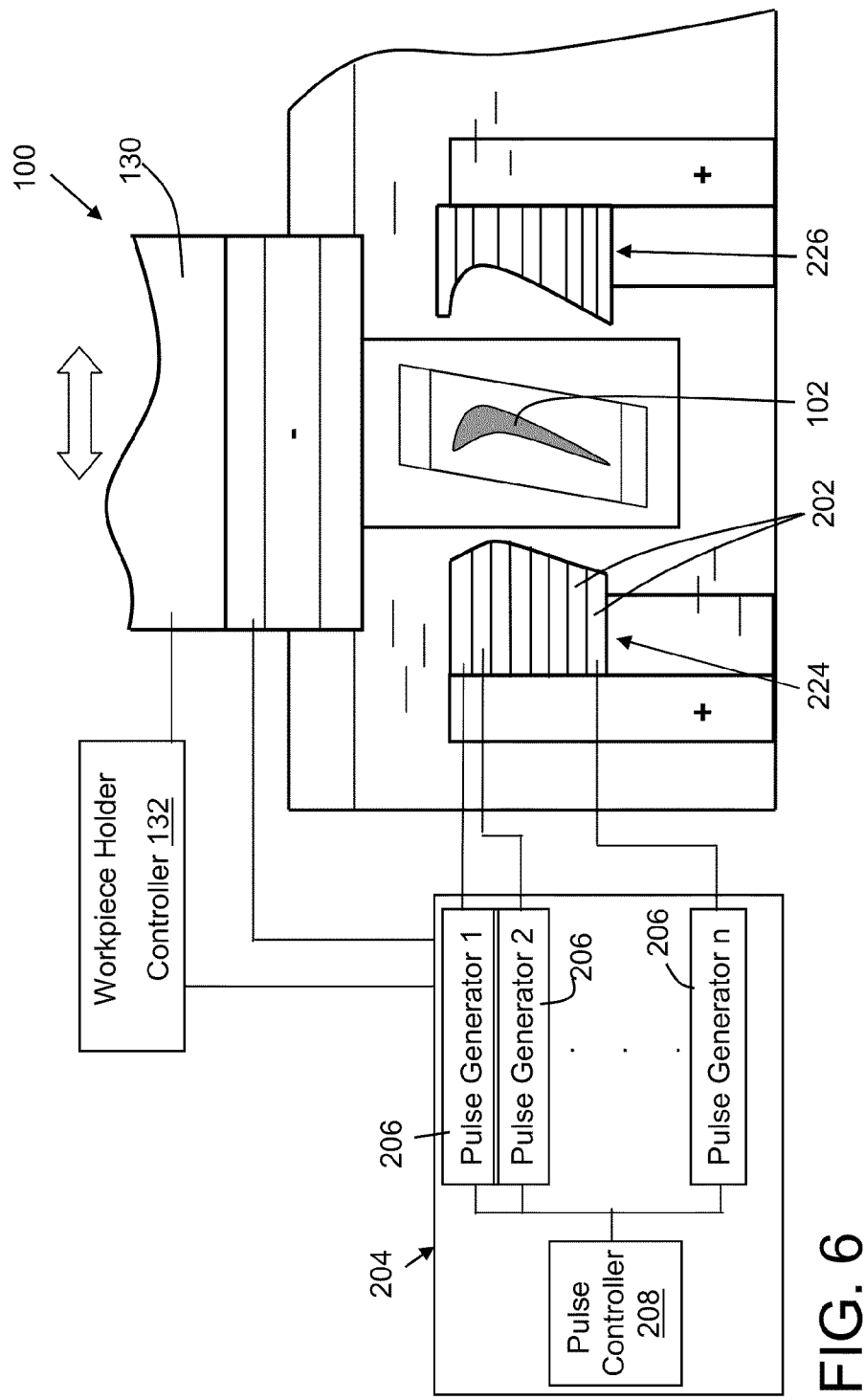
FIG. 6 shows an embodiment of the electrode of FIG. 5 applied to the EDM die sinking device of FIGS. 1-3.

Referring to FIGS. 5 and 6, in another embodiment, an EDM die sinking device 200 may include an electrode 201 including a plurality of electrode segments 202. As with electrodes 104, 106, electrode 202 may include a shape (here planar) for imparting to portion 120 of a workpiece 102. In contrast to conventional EDM die sinking devices, however, pulse generator 204 includes a separate electric pulse generator 206 coupled to each electrode segment 202 of electrode 201. Each electrode segment 202 may be electrically insulated from an adjacent segment by an insulator 212, e.g., a polymer layer. In addition, a pulse controller 208 commanding the same discharge duration and current is coupled to each separate electric pulse generator 206. Each pulse generator 206 includes an independent oscillator for generating an electric discharge 210 with the same discharge energy on each electrode segment 202, independently of other electrode segments 202, to remove material from workpiece 102. In one embodiment, pulse controller 208 commands the same discharge duration, discharge current, and pulse interval to all pulse generators 206 according to the specified metal removal rate and surface roughness. Each pulse generator 206 launches a voltage pulse at the same voltage amplitude and waits for a local fluid (oil) breakdown, which takes place at different times. Upon the local breakdown, each pulse generator 206 starts to count down the discharge duration instructed by pulse controller 208, i.e., via a counter (not shown). The same discharge current instructed by pulse controller 208 is maintained electronically. As soon as the specified discharge expires, each pulse generator 206 stops the voltage pulse, resulting in identical pulse durations for all electrode segments as instructed by pulse controller 208. The counter within each pulse generator 206 may also maintain the instructed pulse interval. Because local breakdowns depend on different local gap status (e.g., different particle density, gap size, and temperature) and ignite randomly at different times, each independent pulse generator 206 is dedicated to the special local situation of its respective electrode segment 202 to achieve uniform electric discharge. These independent pulse generators 206 do not communicate with one another, but adapt to their own local gap situations separately corresponding to the particular electrode segments 202. In FIG. 5, electrical discharges 210 ignite at different times. The same pulse interval may be given at different time instances for different segments 202. However, the system maintains the same discharge energy, namely the same discharge duration and current. That is, while there are as many electrical discharges as there are electrode segments, the discharges last the same duration, but start and stop at different times. The independent and dedicated pulse generators 206 make these uniform but unsynchronized discharges possible. Since segments 202 can be provided with an identical discharge duration/current to have each electric discharge 210 made substantially identical in strength and duration to other electrical discharges, machining results in a better MRR and better surface quality with uniform craters. Furthermore, electrode 201 life can be better controlled.

Electrode 201 may be used with any EDM die sinking machine including, as shown in FIG. 6, EDM die sinking device 100 of FIGS. 1-3. In this case, a first electrode 224 and a second electrode 226, where the latter is used, may each include a plurality of electrode segments 202 configured as illustrated in FIG. 5. Operation of EDM die sinking device 100 with single electrode 104, 106 (FIGS. 1-3) or multiple electrode segments 202 (FIG. 6) will now be described. Workpiece holder controller 132 controls movement of workpiece holder 130, and hence, workpiece 102. Under machine computer numeric control (CNC), workpiece holder controller 132 drives workpiece 102 into a position in tank 110 and between electrodes 104 and 106. During the EDM process, workpiece holder controller 132 detects a (gap) voltage between workpiece 102 and electrode 104 or 106 (and each segment 202, if provided), and controls the feeding speed of workpiece 102 towards electrode 104 or 106 based on the detected voltage. High gap voltage leads to high feeding speed while low gap voltage leads to low feeding speed or even workpiece withdrawal to escape shorting or arcing. Where a segmented electrode 224, 226 is used, workpiece holder controller 132 reduces workpiece 102 feeding, or distances workpiece 102 from the electrode in response to an electric discharge from one of the plurality of electrode segments 202 having a gap voltage lower than a threshold. This situation indicates that shorting or arcing may be occurring at a given location. The threshold may be set to, for example, a given gap voltage that represents a gap status of such a magnitude as to cause pitting or other forms of potential damage. Similarly, workpiece holder controller 132 increases the feeding speed of workpiece 102 towards an electrode in response to none of the plurality of electrode segments 202 discharging to the workpiece. This situation occurs where electrode segments 202 have each machined sufficient material off of workpiece 202 such that the spacing between electrode 200 and workpiece 102 is too distant for further gap breakdowns. Furthermore, workpiece holder controller 132 maintains the feeding speed of workpiece 102 toward an electrode in response to all of the plurality of electrode segments 202 discharging to the workpiece at an expected discharge voltage level. This situation occurs where electrode segments 202 are each machining at equal increments such that the spacing between electrode 201 and workpiece 102 is sufficient for further even machining. This is most often the case near the finishing of machining, where workpiece 102 has substantially taken on the desired shape 120, 160 (FIGS. 2 and 3, respectively). Alternatively, if one or several electrode segments 202 discharge to workpiece 102 at an expected discharge voltage level, the feeding speed is also maintained. This case happens when some projecting portion of the curved electrode surface engages workpiece 102 before other electrode segment(s) 202 of the electrode, which still have too large of a space for breakdown and discharging.

Figure 7A:
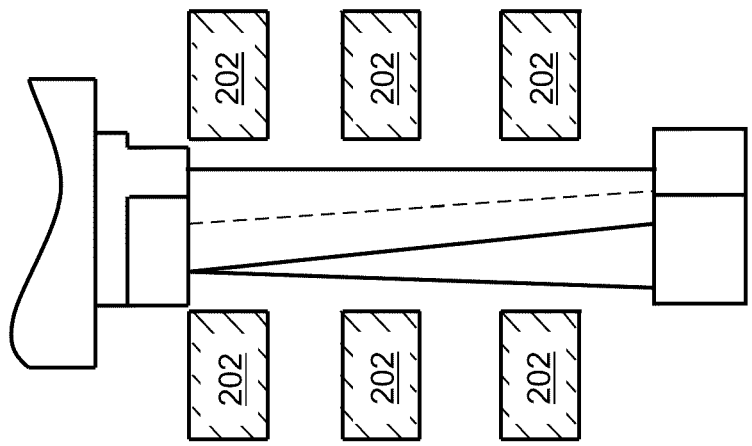
FIGS. 7A-7B show an alternative embodiment of the electrode of FIG. 5 applied to the EDM die sinking device of FIGS. 1-3.
Figure 7B:
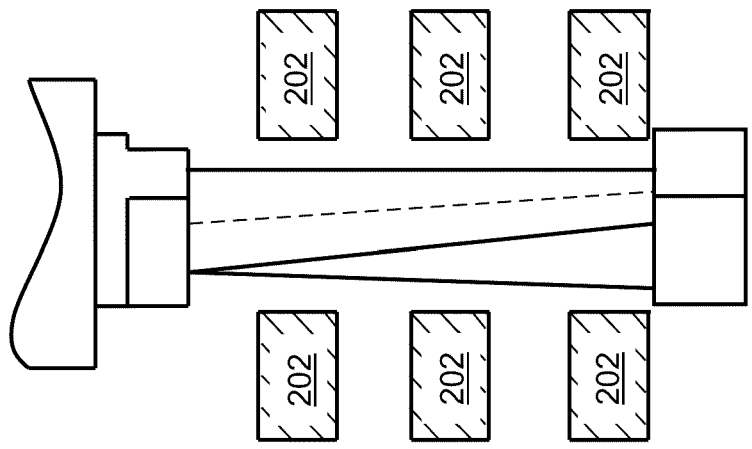

In another embodiment, shown in FIGS. 7A and 7B, electrode segments 202 may be spaced apart from one another rather than separated by an insulator 212. In this fashion, fluid 112 acts as an insulator between segments 202. As shown in FIGS. 7A, 7B, two sets of segmented electrodes 202 may be employed in this case to ensure complete machining of a surface. That is, the set of segmented electrodes 202 in FIG. 7A machine a given set of locations, and the set of segmented electrodes 202 in FIG. 7B machine another given set of locations created by the space between the electrodes 202 of FIG. 7A such that an entire surface is machined. Otherwise, EDM die sinking device 100 operates substantially as described above relative to FIGS. 1-3.

Figure 8:
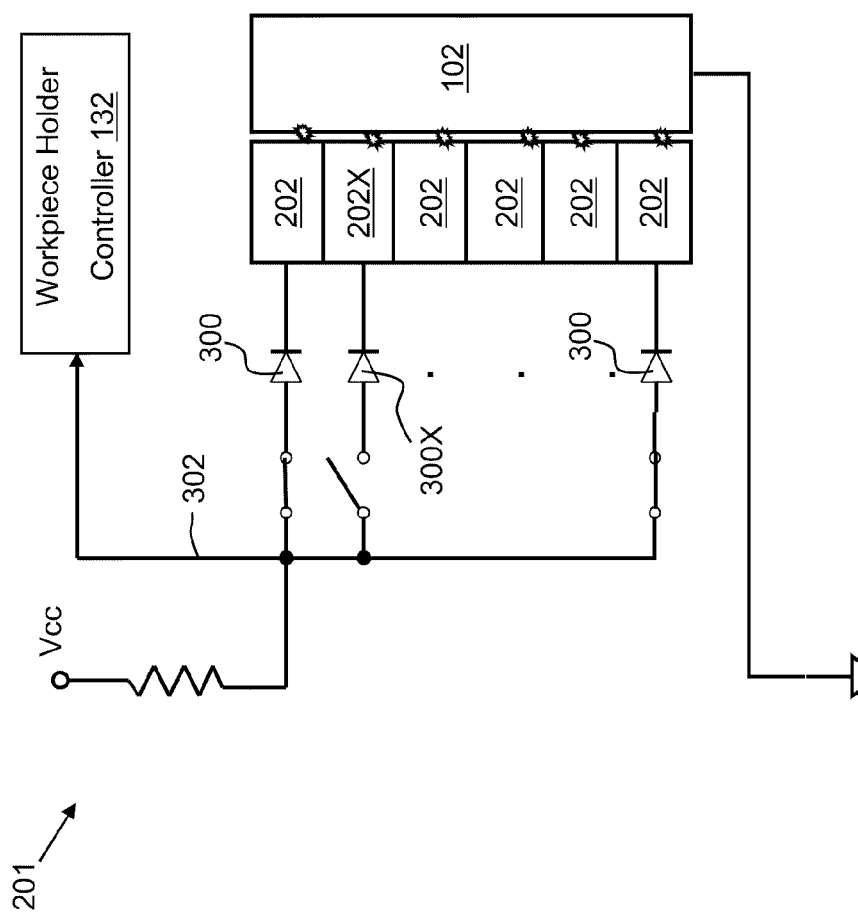
FIG. 8 shows an example of voltage detection of multiple inputs for the workpiece holder controller of FIGS. 5-7B.

Implementation of segmented electrode 201 may take a variety of hardware and/or software forms. FIG. 8 shows an alternative embodiment in which diodes 300 are employed. In the case of multiple electrodes, as in FIGS. 6, 7A and 7B, multiple gap voltage signals exist. In some cases, workpiece holder controller 132 may only be capable of handling one of these voltage signals to control workpiece 102 feeding speed. In order to address this situation, in one embodiment, diodes 300 block higher voltage signals but allow a lowest voltage signal to input to workpiece holder controller 132. That is, diodes 300, connected as shown in FIG. 8, will block the voltage signal when the voltage of a given electrode segment 202 is higher than the voltage at an input point 302 to workpiece holder controller 132, or the juncture of the positive poles of all diodes 300. In this manner, only the lowest voltage of all gap voltages is allowed to pass to workpiece holder controller 132. Such a system ensures that an electrode segment 202 at the closest gap distance among all electrode segments 202 is controlled at the highest priority. It is understood that the electrode segment 202 that is at the lowest gap voltage or closest gap distance can change or switch from one segment to the other. Diodes 300 always select the lowest voltage or electrode segment 202 that closely engages workpiece 202 in electrical discharging or occasional shorting. It is also understood that not all electrode segments 202 operate concurrently. Consequently, a diode 300X of a non-operating or inactive (open) electrode segment(s) 202X may be disconnected from workpiece holder controller 132, thus preventing analysis of that electrode segment. The above-described diodes 300 represent only one way of filtering which voltage signals reach workpiece holder controller 132. Other hardware and/or software implementations can be applied to realize the same process.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electric discharge machining (EDM) die sinking device comprising:
   a tank for holding a fluid;
   a first electrode fixed within the tank, the first fixed electrode immersed in the fluid,
   wherein the first fixed electrode includes a first shape for imparting a first mirror image shape to a first portion of a workpiece;
   a workpiece holder for positioning the workpiece at least partially immersed in the fluid and alternately moving the workpiece laterally between an inoperable position and a first operable position of the first fixed electrode at which electric discharge machining occurs on the first portion;
   a pulse generator for creating an electric discharge between the first portion and the first fixed electrode to remove material from the first portion in response to the workpiece being in the first operable position; and
   a second electrode in the tank, the second electrode having a second shape for imparting a second mirror image shape to a second portion of the workpiece,
   wherein the workpiece holder moves the workpiece laterally between the first operable position of the first fixed electrode at which electric discharge machining occurs on the first portion, the inoperable position, and a second operable position of the second electrode at which electric discharge machining occurs on the second portion, and
   wherein the pulse generator creates an electric discharge between the second portion and the second electrode to remove material from the second portion in response to the workpiece being in the second operable position.

2. The EDM die sinking device of claim 1, wherein the electric discharge machining creates a particle containing fluid including particles of the workpiece suspended therein, and the lateral movement of the workpiece between the inoperable position and the first operable position causes the particle containing fluid to be at least partially drawn out of a space vacated by the workpiece.

3. The EDM die sinking device of claim 2, further comprising a nozzle for injecting fluid into the space vacated by the workpiece.

4. The EDM die sinking device of claim 1, wherein the lateral movement of the workpiece between the inoperable position and each of the first operable position and the second operable position causes the particle containing fluid to be at least partially drawn out of a space vacated by the workpiece.

5. The EDM die sinking device of claim 1, wherein the pulse generator causes the first fixed electrode to have a positive polarity and the workpiece to have a negative polarity.

6. The EDM die sinking device of claim 1, wherein the first fixed electrode includes a plurality of electrode segments, and the pulse generator includes a separate electric pulse generator coupled to each electrode segment, and further comprising a pulse controller coupled to each separate electric pulse generator for generating an electric discharge from each electrode segment independently of other electrode segments.

7. The EDM die sinking device of claim 6, wherein each electric discharge is substantially identical in strength and duration.

8. The EDM die sinking device of claim 6, wherein the plurality of electrode segments are spaced apart from one another.

9. The EDM die sinking device of claim 6, further comprising a workpiece holder controller for controlling the lateral movement of the workpiece holder.

10. The EDM die sinking device of claim 9, wherein the workpiece holder controller detects a voltage between the workpiece and each electrode segment of the first fixed electrode, and controls a feeding speed of the workpiece towards the first fixed electrode based on the detected voltages.

11. The EDM die sinking device of claim 10, wherein the workpiece holder controller:
increases the feeding speed in response to none of the plurality of electrode segments discharging to the workpiece, and
decreases the feeding speed or distances the workpiece from the first fixed electrode in response to one of the plurality of electrode segments discharging to the workpiece at a voltage lower than a threshold.

12. The EDM die sinking device of claim 10, wherein the workpiece holder controller maintains the feeding speed of the workpiece toward the first fixed electrode in response to all of the plurality of electrode segments discharging to the workpiece at a substantially identical voltage.

13. An electric discharge machining (EDM) die sinking device comprising:
a first fixed electrode including a plurality of electrode segments, the first fixed electrode including a first shape for imparting a first mirror image shape to a first portion of a workpiece;
a plurality of electric pulse generators coupled to the plurality of electrode segments,
wherein each of the plurality of electric pulse generators is coupled to a distinct electrode segment of the first fixed electrode;
a pulse controller coupled to each of the plurality of electric pulse generators for generating an electric discharge on each distinct electrode segment independently of other electrode segments to remove material from the first portion of the workpiece;
a workpiece holder for positioning the workpiece relative to the first fixed electrode; and
a workpiece holder controller for controlling lateral movement of the workpiece holder;
wherein the workpiece holder controller:
detects a voltage between the workpiece and each electrode segment of the first fixed electrode;
controls a feeding speed of the workpiece towards the first fixed electrode based on the detected voltages;
increases the feeding speed in response to none of the plurality of electrode segments discharging to the workpiece;
decreases the feeding speed or distances the workpiece from the first fixed electrode in response to one of the plurality of electrode segments discharging to the workpiece at a voltage lower than a threshold; and
maintains the feeding speed of the workpiece toward the first fixed electrode in response to one of the plurality of electrode segments discharging to the workpiece at an expected discharge voltage level or all of the plurality of electrode segments discharging to the workpiece at the expected discharge voltage level.

14. The EDM die sinking device of claim 13, wherein each electric discharge is substantially identical in strength and duration.

15. The EDM die sinking device of claim 13, wherein the plurality of electrode segments are spaced apart from one another and positioned in a vertical arrangement.

16. The EDM die sinking device of claim 13, further comprising:
a tank for holding a fluid, the first fixed electrode being fixed within the tank, and
wherein the workpiece holder positions the workpiece at least partially immersed in the fluid and moves the workpiece laterally between an inoperable position and a first operable position of the first fixed electrode at which electric discharge machining occurs on the first portion of the workpiece.

17. The EDM die sinking device of claim 16, further comprising:
a second electrode including a plurality of electrode segments, the second electrode having a second shape for imparting a second mirror image shape to a second portion of the workpiece; and
a plurality of electric pulse generators coupled to the plurality of electrode segments,
wherein each of the plurality of electric pulse generators is coupled to a distinct electrode segment of the second electrode,
wherein the workpiece holder controller moves the workpiece laterally between the first operable position of the first fixed electrode at which electric discharge machining occurs on the first portion, the inoperable position, and a second operable position of the second electrode at which electric discharge machining occurs on the second portion, and
wherein the pulse controller is coupled to each of the plurality of electric pulse generators of the second electrode for generating an electric discharge on each electrode segment independently of other electrode segments to remove material from the second portion of the workpiece.

* * * * *